(12) United States Patent
Davda et al.

(10) Patent No.: US 9,898,430 B2
(45) Date of Patent: Feb. 20, 2018

(54) TRACKING VIRTUAL MACHINE MEMORY MODIFIED BY A SINGLE ROOT I/O VIRTUALIZATION (SR-IOV) DEVICE

(71) Applicant: VMware, Inc., Palo Alto, CA (US)

(72) Inventors: Bhavesh Davda, Fremont, CA (US); Xin Xu, Arlington, VA (US); Guolin Yang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 524 days.

(21) Appl. No.: 14/539,528

(22) Filed: Nov. 12, 2014

(65) Prior Publication Data

US 2016/0132443 A1 May 12, 2016

(51) Int. Cl.
*G06F 13/28* (2006.01)
*G06F 13/24* (2006.01)
*G06F 9/455* (2006.01)

(52) U.S. Cl.
CPC .......... *G06F 13/28* (2013.01); *G06F 9/45558* (2013.01); *G06F 13/24* (2013.01); *G06F 2009/45579* (2013.01); *G06F 2009/45583* (2013.01)

(58) Field of Classification Search
CPC ...... G06F 13/24; G06F 13/28; G06F 9/45558; G06F 2009/45579; G06F 2009/45583
See application file for complete search history.

(56) References Cited

U.S. PATENT DOCUMENTS

2011/0078361 A1* 3/2011 Chen ..................... G06F 12/145
   711/6
2012/0042034 A1* 2/2012 Goggin .................. G06F 9/4856
   709/216
2012/0179855 A1* 7/2012 Tsirkin ................ G06F 9/45558
   711/6
2013/0318523 A1* 11/2013 Curtis ................. G06F 9/45558
   718/1
2016/0098372 A1* 4/2016 Boyle ................. G06F 13/4282
   710/313

OTHER PUBLICATIONS

Tasoulas, Vangelis, "Prototyping Live Migration With SR-IOV Supported InfiniBand HCAs", HPC Advisory Council-Spain Conference 2013, Sep. 12, 2013, pp. 1-33.
Zhenhao, Pan et al, "CompSC: Live Migration with Pass-through Devices", Interational Conference on Virtual Execution Environment 2012, Mar. 3-4, 2012, pp. 109-120, London, United Kingdom.

* cited by examiner

*Primary Examiner* — Eric Oberly

(57) ABSTRACT

Techniques for tracking, by a host system, virtual machine (VM) memory modified by a physical input/output (I/O) device that supports I/O virtualization are provided. In one embodiment, a hypervisor of the host system can receive a hardware interrupt from the physical I/O device, where the hardware interrupt indicates that a virtual function (VF) of the physical I/O device has completed a direct memory access (DMA) write to a guest memory space of a VM running on the host system. In response to the hardware interrupt, the hypervisor can invoke a function implemented by a physical function (PF) driver of the physical I/O device, where the function is configured to inspect the VF's state in order to identify memory portions modified by the DMA write. The hypervisor can then mark, in a hypervisor-level page table, one or more memory pages corresponding to the identified memory portions as dirty pages.

25 Claims, 4 Drawing Sheets

TRACKING VIRTUAL MACHINE MEMORY MODIFIED BY A SINGLE ROOT I/O VIRTUALIZATION (SR-IOV) DEVICE

BACKGROUND

Single Root I/O Virtualization (SR-IOV) is a specification defined by computer industry group PCI-SIG for improving I/O performance in scenarios where a physical PCIe I/O device is shared among multiple applications or virtual machines (known generally as "I/O virtualization"). With a typical, hypervisor-based approach to I/O virtualization (which does not make use of SR-IOV), a hypervisor emulates the physical I/O device using a virtual I/O device. For example, the virtual I/O device receives, from a guest device driver in each virtual machine (VM), I/O operations requested by the VM and processes the I/O operations before passing them on to the physical I/O device via a host device driver. Conversely, the virtual I/O device receives, from the host device driver, I/O operations requested by the physical I/O device (and destined for a particular VM) and processes the I/O operations before passing them on to the appropriate VM via the VM's guest device driver. While this hypervisor-based approach is functional, it is inefficient because the I/O operations must traverse two I/O stacks—one in the VM and another in the hypervisor—which increases latency. In addition, this approach incurs CPU overhead in order to implement the virtual I/O device, which can reduce the maximum throughput to/from the physical I/O device (due to, e.g., the additional CPU clock cycles needed to process I/O at the hypervisor level).

SR-IOV overcomes the inefficiencies above by allowing the physical I/O device to directly write data to, and read data from, the guest memory space of each VM sharing the device, thereby bypassing the hypervisor. This eliminates the overhead incurred by the virtual I/O device and enables the system hosting the physical I/O device to achieve a level of I/O performance that is similar to non-virtualized scenarios. In practice, a physical I/O device that supports SR-IOV (referred to herein as a "SR-IOV device") implements multiple, independent virtual functions (VFs), each of which appears on the PCIe bus as a separate instance of the device. These multiple VFs map to a single PCIe physical function (PF) of the physical I/O device. At runtime, the hypervisor assigns one or more VFs to each VM executing on the host system. Each VF then communicates directly with the guest device driver (i.e., "VF driver") within the VF's assigned VM to enable data movement between VM guest memory and the physical I/O device via direct memory access (DMA), without requiring intermediary processing by a virtual I/O device in the hypervisor. For instance, when a SR-IOV device receives data destined for a particular VM, the VF assigned to that VM uses DMA to directly copy the data to one or more receive (RX) buffers in VM guest memory. The SR-IOV device then posts a hardware interrupt to the hypervisor indicating that the DMA transaction is complete. In response to the hardware interrupt, the hypervisor injects a virtual interrupt into the target VM, thereby signaling to the VF driver in the VM that the data in the RX buffers may be processed.

One limitation with SR-IOV as it exists today is that, due to the manner in which the physical I/O device's VF directly writes data to VM guest memory, SR-IOV is incompatible with certain virtualization features, such as live VM migration (e.g., vMotion). To understand this incompatibility, consider the typical workflow for a live VM migration event. During a long, first phase (known as the "pre-copy" phase), the hypervisor on a source host copies VM memory pages from the source host to a destination host while the VM is running. Since the VM is active during this phase, the hypervisor keeps track of the memory pages that are modified (i.e., dirtied) by the VM as it runs and copies those pages over (potentially multiple times) to ensure that the destination host has the VM's most up-to-date memory state. The hypervisor is able to track this for CPU-initiated writes, since the hypervisor virtualizes VM memory page tables in one or more nested, hypervisor-level page tables (referred to as Extended Page Tables, or EPT). Then, during a short, second phase (known as the "switch-over" phase), the original VM on the source host is shut down and the new VM on the destination host is brought up.

However, when SR-IOV is enabled, the CPU is not the only entity capable of writing data into VM guest memory; as noted above, the VF of a SR-IOV device may also write data into VM guest memory using DMA. The hypervisor cannot track these VF-initiated DMA writes because the EPT is only updated for CPU-initiated memory transactions. As a result, the VM memory pages that are modified by the SR-IOV device via DMA cannot be identified by the hypervisor as "dirty" during the pre-copy phase of the VM migration, and thus cannot be properly copied over to the destination host, thereby breaking the migration process. Similar problems exist when attempting to use SR-IOV in conjunction with other virtualization features that rely on hypervisor-level tracking of dirty VM memory pages, such as snapshots, fault tolerance, etc.

One known solution for this incompatibility is to modify the VF driver and guest operating system (OS) running within each VM to notify the hypervisor whenever a memory page has been dirtied due to a VF-initiated DMA write. The hypervisor can then mark those pages as dirty in the EPT for facilitating VM migration (or other features). Unfortunately, since this solution effectively requires the VF driver and guest OS to be para-virtualized, it will not work with standard OS/driver distributions. Further, this solution may fail in scenarios where the VM is temporarily suspended or stopped but the VF of the SR-IOV device continues performing DMA writes to the VM's RX buffers. In these scenarios, the code resident within the VM for notifying the hypervisor will also be suspended, and thus the hypervisor will not know (during the period of VM downtime) which memory pages are dirtied by the SR-IOV device.

SUMMARY

Techniques for tracking, by a host system, VM memory modified by a physical I/O device that supports I/O virtualization (e.g., a SR-IOV device) are provided. In one embodiment, a hypervisor of the host system can receive a hardware interrupt from the physical I/O device, where the hardware interrupt indicates that a VF of the physical I/O device has completed a DMA write to a guest memory space of a VM running on the host system. In response to the hardware interrupt, the hypervisor can invoke a function implemented by a PF driver of the physical I/O device, where the function is configured to inspect the VF's state in order to identify memory portions modified by the DMA write. The hypervisor can then mark, in a hypervisor-level page table, one or more memory pages corresponding to the identified memory portions as dirty pages.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that can be implemented by the hypervisor of a host system for tracking VM memory pages that have been modified (i.e., dirtied) via DMA by a physical I/O device that supports I/O virtualization (e.g., a SR-IOV device). In one set of embodiments, these techniques can include determining, by the hypervisor, when a VF of the SR-IOV device has completed a DMA write to the guest memory space of a VM and, upon making that determination, invoking an introspection function implemented by a host device driver (i.e., "PF driver") to inspect the VF's state. The introspection function can access a RX descriptor ring associated with the VF/VM and identify, based on the descriptor entries of the ring, portions of VM memory have been written-to as a result of the DMA write. The hypervisor can then mark the memory pages corresponding to the identified memory portions as dirty in the hypervisor's EPT, thereby allowing those dirty memory pages to be processed by virtualization features (e.g., live VM migration, snapshots, fault tolerance, etc.) that rely on such dirty page information.

Significantly, the techniques of the present disclosure do not require any changes to the guest OS or VF driver running within each VM of the host system; they only involve changes to the hypervisor and PF driver. Thus, unlike alternative solutions that require para-virtualization, these techniques may be used with standard guest OS/driver distributions.

Further, the techniques of the present disclosure are not limited to specific SR-IOV devices, but instead may be generically applied to any type of SR-IOV device (e.g., network interface cards (NICs), host bus adapters (HBAs), etc.) whose PF driver is configured to implement the introspection function mentioned above for identifying DMA-written memory regions. In a particular embodiment, the interface for the introspection function may be a predetermined callback interface that is defined by the hypervisor and made available to device vendors for implementation in their respective PF drivers.

The foregoing and other aspects of the present disclosure are described in further detail in the sections that follow.

2. System Environment

Figure 1:
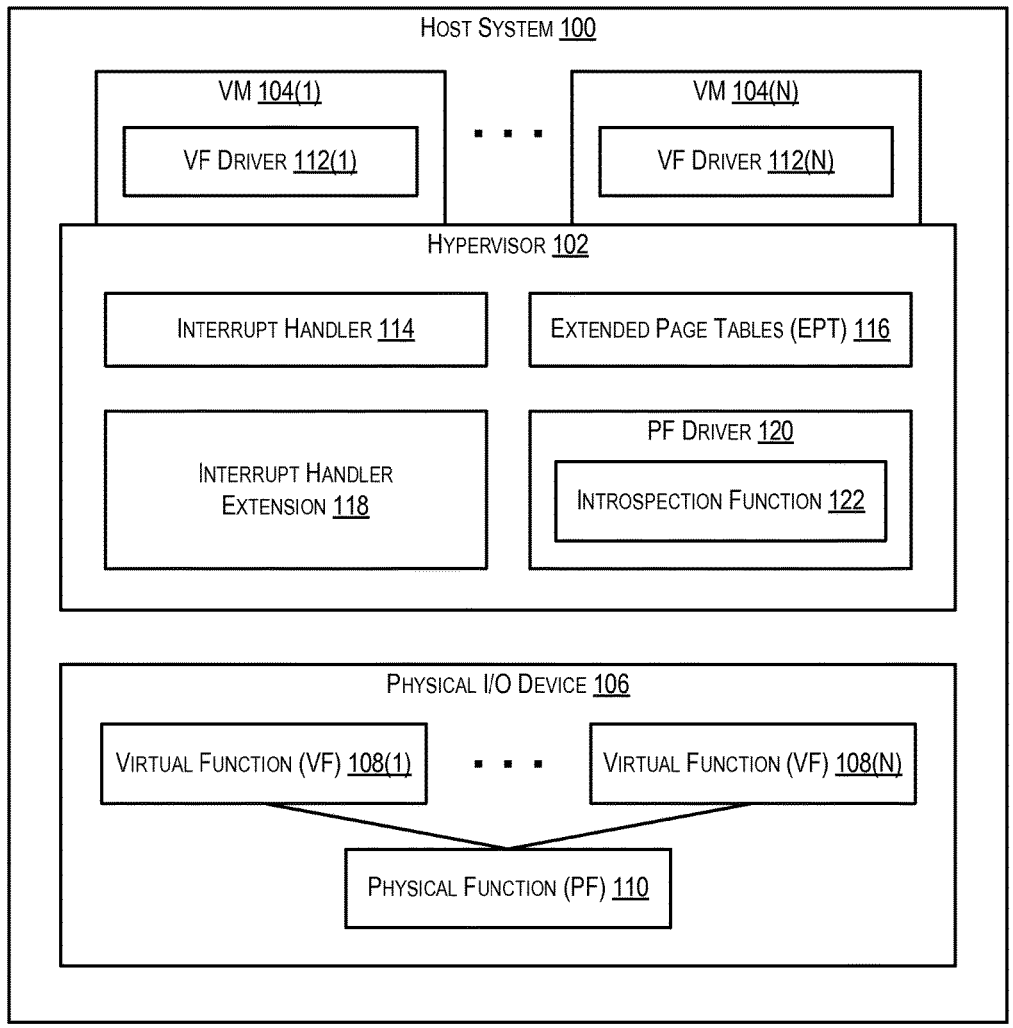
FIG. 1 depicts a host system that supports tracking of VM memory modified by a SR-IOV device according to an embodiment.

FIG. 1 depicts a host system 100 that supports tracking of VM memory modified by an SR-IOV device according to an embodiment. As shown, host system 100 includes a virtualization software layer (i.e., hypervisor) 102 that provides an environment in which one or more VMs 104(1)-104(N) can run. Hypervisor 102 allows VMs 104(1)-104(N) to share the hardware resources available on host system 100, such as CPU, memory, storage and networking resources. In one embodiment, hypervisor 102 maintains address translation mappings between guest physical memory for each VM (i.e., the memory visible to a guest operating system (OS) running in the VM, also referred to as VM memory) and host physical memory (the hardware memory available on host system 100) using memory page tables such as EPT 116. Further, each VM maintains address translation mappings between guest virtual memory (i.e., a continuous virtual address space presented by the guest OS to applications) and guest physical memory.

Host system 100 further includes a physical I/O device 106 that is shared among VMs 104(1)-104(N). Physical I/O device 106 can be, e.g., a NIC, a HBA, or the like. In the specific embodiment of FIG. 1, physical I/O device 106 is a SR-IOV device—in other words, physical I/O device 106 supports the SR-IOV specification defined by PCI-SIG. Accordingly, physical I/O device 106 exposes a number of virtual functions (VFs) 108(1)-108(N) that represent separate, virtual instances of physical I/O device 106 on host system 100's PCIe bus. Each VF 108(1)-108(N) is assigned to a corresponding VM 104(1)-104(N). Further, each VF 108(1)-108(N) is associated with a single physical function (PF) 110 of physical I/O device 106. PF 110 is used to configure and manage the capabilities of physical I/O device 106, such as enabling/disabling SR-IOV, provisioning VFs, managing VF state, and so on.

In a conventional SR-IOV workflow, when a SR-IOV device like device 106 receives data destined for a particular VM 104(X), the VF assigned to that VM (e.g., VF 108(X)) uses DMA to directly write the data to one or more RX buffers in the guest memory space of VM 104(X). Once the DMA write transaction is complete, physical I/O device 106 posts a hardware interrupt to an interrupt handler 114 of hypervisor 102. Interrupt handler 114 then injects a virtual interrupt into VM 104(X), thereby informing a VF driver 112(X) in the VM that it may process the data in the RX buffers. As discussed in the Background section, the problem with this conventional workflow is that hypervisor 102 cannot track which VM memory regions are modified by the VF-initiated DMA write in its memory page tables (e.g., EPT 116). As a result, there is no way for hypervisor 102 to know which memory pages are dirtied by the DMA write, which renders SR-IOV incompatible with virtualization features that rely on such information (e.g., live VM migration, snapshots, fault tolerance, etc.).

To address the foregoing and other similar issues, hypervisor 102 of FIG. 1 is configured to include a novel interrupt handler extension 118 and a novel introspection function 122 (resident within a PF driver 120). As described in further detail below, interrupt handler extension 118 and introspection function 122 can work together and with other components of host system 100 (e.g., interrupt handler 114, PF 110, and EPT 116) to enable hypervisor-level tracking of VM memory pages (i.e., the pages in guest physical memory) that are dirtied via DMA by VFs 108(1)-108(N) of physical I/O device 106. With this tracking in place, host system 100 can leverage the SR-IOV functionality of device 106 to improve runtime I/O performance for VMs 104(1)-104(N), while at the same time ensuring that the DMA-modified VM memory pages can be properly identified and processed by virtualization features such live VM migration, snapshots, fault tolerance, and so on.

It should be appreciated that FIG. 1 is illustrative and not intended to limit the embodiments herein. For example, the various components depicted in host system 100 may have other capabilities/functions or include other subcomponents that are not described. Further, although a particular arrangement of these components is shown, other arrangements and configurations are also possible. One of ordinary skill in the art will recognize many variations, modifications, and alternatives.

3. High Level Workflow

Figure 2:
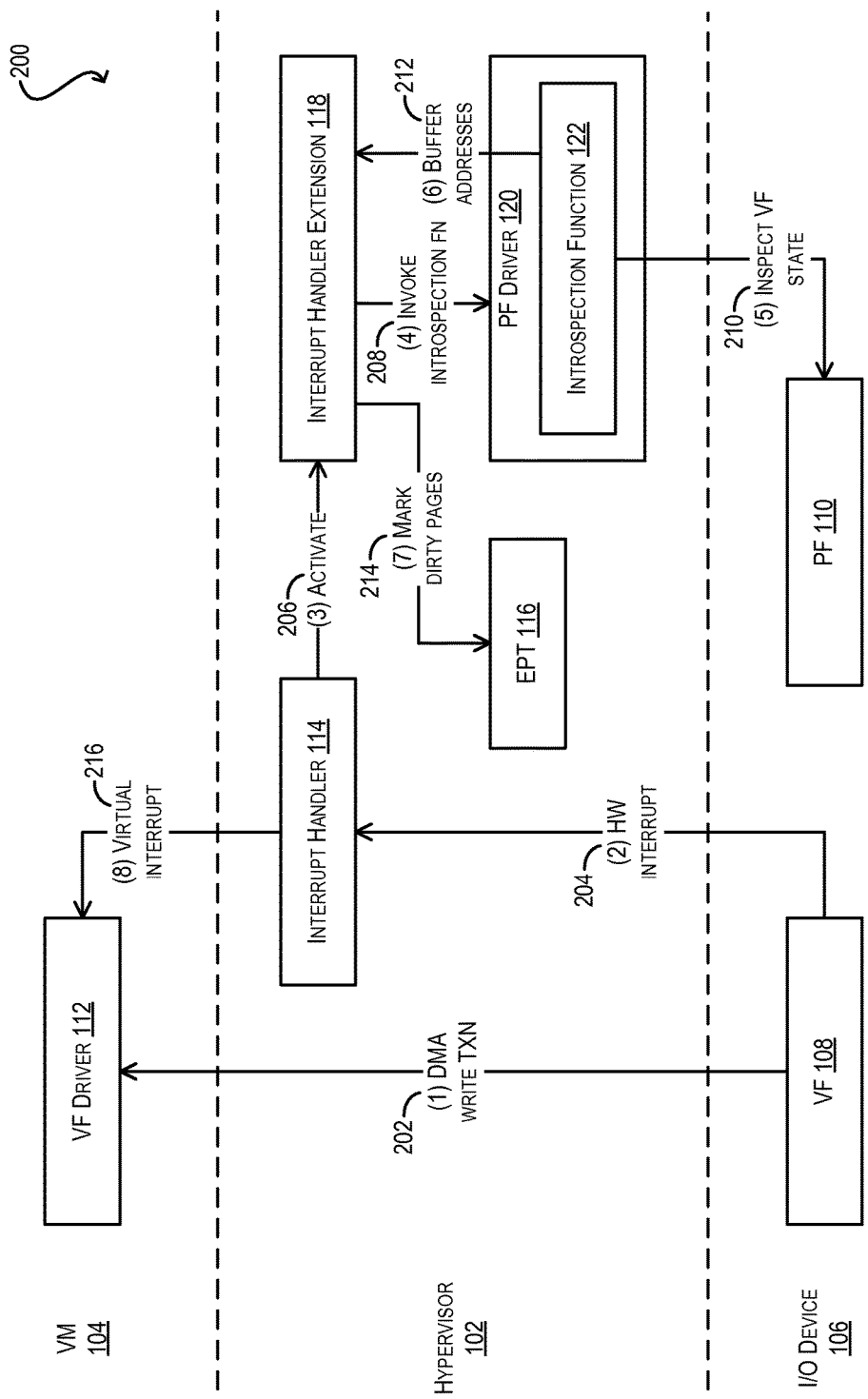
FIG. 2 depicts a workflow within the host system of FIG. 1 for tracking dirty memory pages according to an embodiment.

FIG. 2 depicts a high level workflow 200 that may be implemented within host system 100 of FIG. 1 for tracking VM memory pages modified via DMA by physical I/O device 106 according to an embodiment. Starting with step (1) (reference numeral 202), VF 108 of physical I/O device 106 can initiate a DMA transaction for writing data to one or more available RX buffers in the guest memory space of VM 104. For example, in scenarios where physical I/O device 106 is a NIC, the data may correspond to network traffic that is received on an ingress port of device 106 and destined for VM 104. Generally speaking, VF 108 learns the physical addresses of the RX buffers from descriptor entries that are maintained in a RX descriptor ring by VF driver 112 of VM 104. In a particular embodiment, VF 108 may fetch a number of these descriptor entries ahead of time from VF driver 112 and store copies of the fetched descriptor entries in local device registers on physical I/O device 106. VF 108/device 106 may also maintain pointers to the head and/or tail of the RX descriptor ring in local device registers.

Once the DMA write transaction has been completed, VF 108 can post a hardware interrupt indicating that completion to interrupt handler 114 of hypervisor 102 (step (2), reference numeral 204). In response, interrupt handler 114 can activate (e.g., schedule) interrupt handler extension 118 for the purpose of initiating the dirty page tracking process (step (3), reference numeral 206). In embodiments where hypervisor 102 makes use of a Linux-based kernel, interrupt handler extension 118 can be implemented as a tasklet, which is a deferred mechanism in Linux for performing interrupt-handling work. In other embodiments, interrupt handler extension 118 can be implemented using other mechanisms, such as a kernel thread, DPC (deferred procedure call), etc.

At step (4) (reference numeral 208), interrupt handler extension 118 can invoke introspection function 122 resident in PF driver 120. In one embodiment, introspection function 122 can be implemented as a callback function with a predetermined interface that is defined by hypervisor 102 (thereby allowing interrupt handler extension 118 to use the same function invocation for different devices 106/PF drivers 120). Upon being invoked, introspection function 122 can access PF 110 of physical I/O device 106 and, through PF 110, inspect the state of VF 108 in order to determine the portions of VM memory that were modified by the VF in the last DMA transaction (step (5), reference numeral 210). For example, as part of step (5), introspection function 122 can (a) access the RX descriptor ring associated with VF 108/ VM 104, (b) traverse the descriptor entries of the ring, and (c) based on the descriptor entries, identify VM physical buffer addresses corresponding to the VM RX buffers written-to at step (1). At step (6) (reference numeral 212), introspection function 122 can return these identified VM buffer addresses (i.e., guest physical addresses) to interrupt handler extension 118.

At step (7) (reference numeral 214), interrupt handler extension 118 can mark the memory pages corresponding to the identified buffer addresses as dirty in EPT 116. Finally, interrupt handler 114 can inject a virtual interrupt into VM 104, thereby informing VF driver 112 that it may proceed with processing the data written into the RX buffers by VF 108 (step (8), reference numeral 216).

With the workflow shown in FIG. 2, a number of advantages may be realized. First, as mentioned previously, since workflow 200 enables hypervisor 102 to have real-time visibility of the VM memory pages dirtied via DMA by physical I/O device 106, hypervisor 102 can act on this information as-needed to ensure compatibility between the SR-IOV capabilities of device 106 and various virtualization features. For instance, in a scenario where VM 104 is live migrated from host system 100 to a destination host, hypervisor 102 can copy over the VM memory pages that are marked as dirty at step (8) of workflow 200 to the destination host during the pre-copy phase of the migration event. In this way, the memory state of the migrated VM on the destination host can be made consistent with VM 104 on host system 100, regardless of whether the VM's memory is being modified from the CPU side or the I/O device side.

Second, since workflow 200 does not require any changes to the guest OS of VM 104 or VF driver 112, workflow 200 can be used with standard OS/driver distributions, thereby promoting quick and easy adoption by end-users.

4. Detailed Flowcharts

Figure 3:
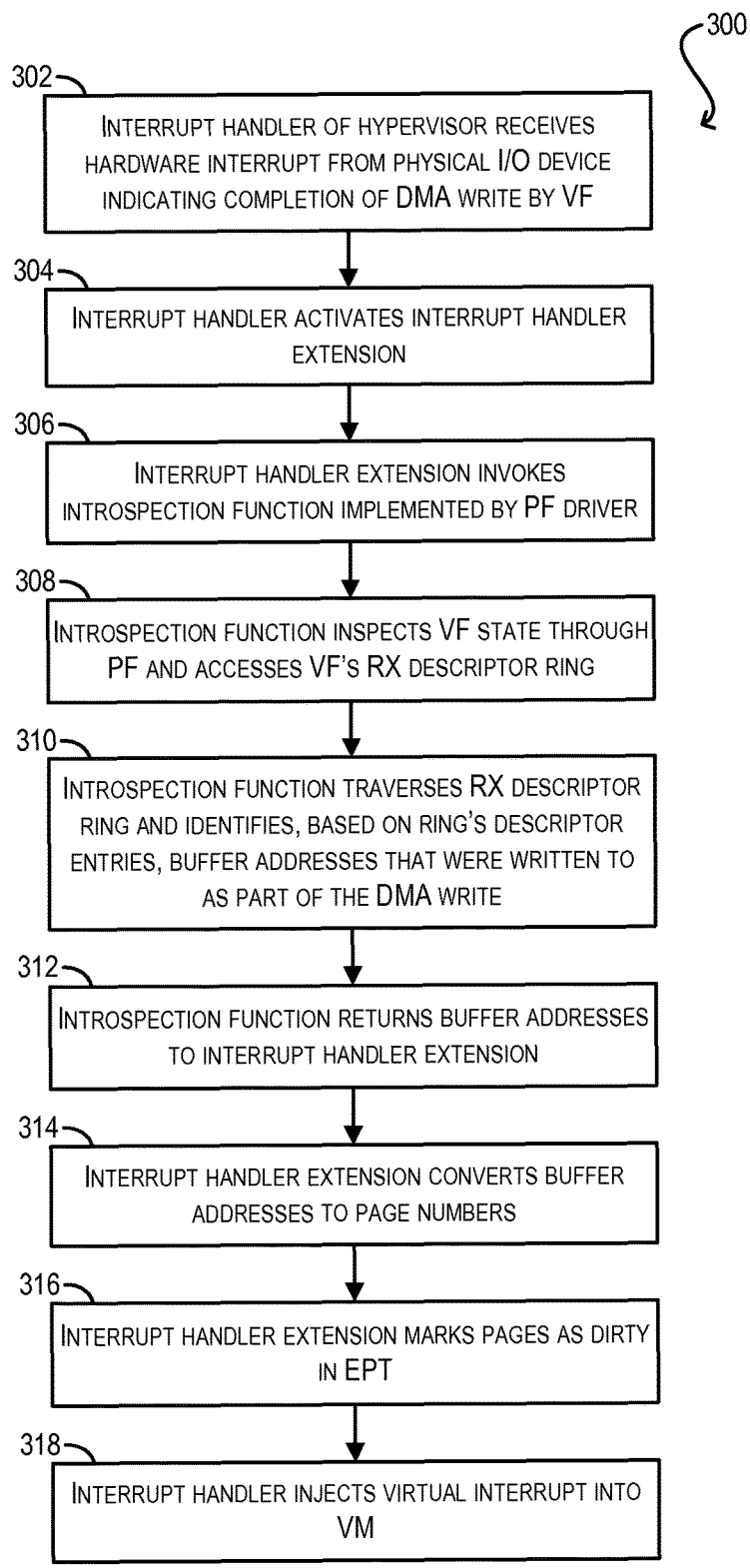
FIG. 3 depicts a flowchart that provides additional details regarding the workflow of FIG. 2 according to an embodiment.

FIG. 3 depicts a detailed flowchart 300 of the processing attributed to hypervisor 102 in workflow 200 of FIG. 2 according to an embodiment. At block 302, interrupt handler 114 of hypervisor 102 can receive a hardware interrupt from physical I/O device 106 indicating completion of the DMA write by VF 108. In response, interrupt handler 114 can activate interrupt handler extension 118 (block 304). As noted with respect to FIG. 2, interrupt handler extension 118 can be implemented as a tasklet, DPC, etc. depending on the architecture of hypervis or 102.

At block 306, interrupt handler extension 118 can invoke introspection function 122 of PF driver 120. Introspection function 122 can then inspect, via PF 110, VF 108's state in order to identify the portions of VM memory modified by VF 108 in the immediately previous DMA transaction (block 308). This can involve accessing the RX descriptor ring of VF 108/VM 104 and traversing the entries of the descriptor ring to identify guest physical buffer addresses that were written-to as part of the DMA transaction (block 310).

Generally speaking, the specific manner in which blocks 308 and 310 are carried out will depend on how the RX descriptor ring and its corresponding descriptor entries are defined/managed by VF driver 112 and physical I/O device 106. For example, in one set of embodiments, each descriptor entry may include a status bit that is set once the buffer address corresponding to that entry is written-to via DMA; in these embodiments, introspection function 122 can simply identify the buffer addresses corresponding to descriptor entries in the ring that have this status bit enabled. It should be noted that the descriptor entries themselves are modified in this implementation (due to the setting of the status bit), and thus introspection function 122 may also need to identify the portion(s) of VM memory where the descriptor entries are stored as part of block 310.

In other embodiments, introspection function 122 can track the position of a head pointer for the RX descriptor ring that is updated by physical I/O device 106 each time a VF performs a DMA write to a buffer address of an available descriptor in the ring. As noted previously, this head pointer may be stored in a local device register on device 106 (and memory mapped into VM memory space). Introspection function 122 can then determine which buffer addresses were consumed in the most recent DMA transaction based on how far the head pointer has been moved. For example, if the head pointer was advanced five entries since the last interrupt, the introspection function 122 can determine that the buffer addresses of those five entries were written-to in the last DMA write.

One complication with the processing of block 310 is that, for certain I/O devices, the device may modify the descriptor retrieved from the VF driver once DMA is complete and subsequently write-back the modified descriptor to the VM guest memory. This modification can, in some cases, overwrite the buffer address in the descriptor, which means that introspection function 122 has no way of retrieving that buffer address at block 310.

To address this, in certain embodiments, PF 110/introspection function 122 can be modified to maintain a "shadow" copy of the RX descriptor ring for each VM 104(1)-104(N). The descriptor entries of this shadow copy are not modified/overwritten at DMA completion. Accordingly, during the processing of block 310, introspection function 122 can traverse the shadow copy of the RX descriptor ring (rather than the modified copy in VM guest memory) in order to identity the correct buffer address for each descriptor entry.

Once introspection function 122 has identified the buffer addresses (the guest physical addresses) of VM memory regions that have been written-to by VF 108, introspection function 122 can return the buffer addresses to interrupt handler extension 118 (block 312). Interrupt handler extension 118 can then convert the buffer addresses into memory page numbers and mark those memory pages as dirty in EPT 116. Finally, interrupt handler 114 can inject a virtual interrupt into VM 104 and the processing of flowchart 300 can end (block 318).

It should be appreciated that flowchart 300 of FIG. 3 is illustrative and various modifications are possible. For example, in one alternative embodiment, introspection function 122 can be solely responsible for retrieving information regarding VF 108's state at block 308 (e.g., base/head/tail/length registers for the VF's associated RX descriptor ring). Once retrieved, introspection function 122 can return this state information to interrupt handler extension 118. Interrupt handler extension 118 (rather than introspection function 122) can then use the state information at block 310 to traverse the RX descriptor ring in VM memory and identify the buffer addresses written-to in the last DMA write. This approach may be preferable in certain implementations since the RX descriptor ring resides in main system memory, and thus may be more easily/securely inspected in the context of the hypervisor kernel, rather than PF driver 120. One of ordinary skill in the art will recognize other variations, modifications, and alternatives.

Figure 4:
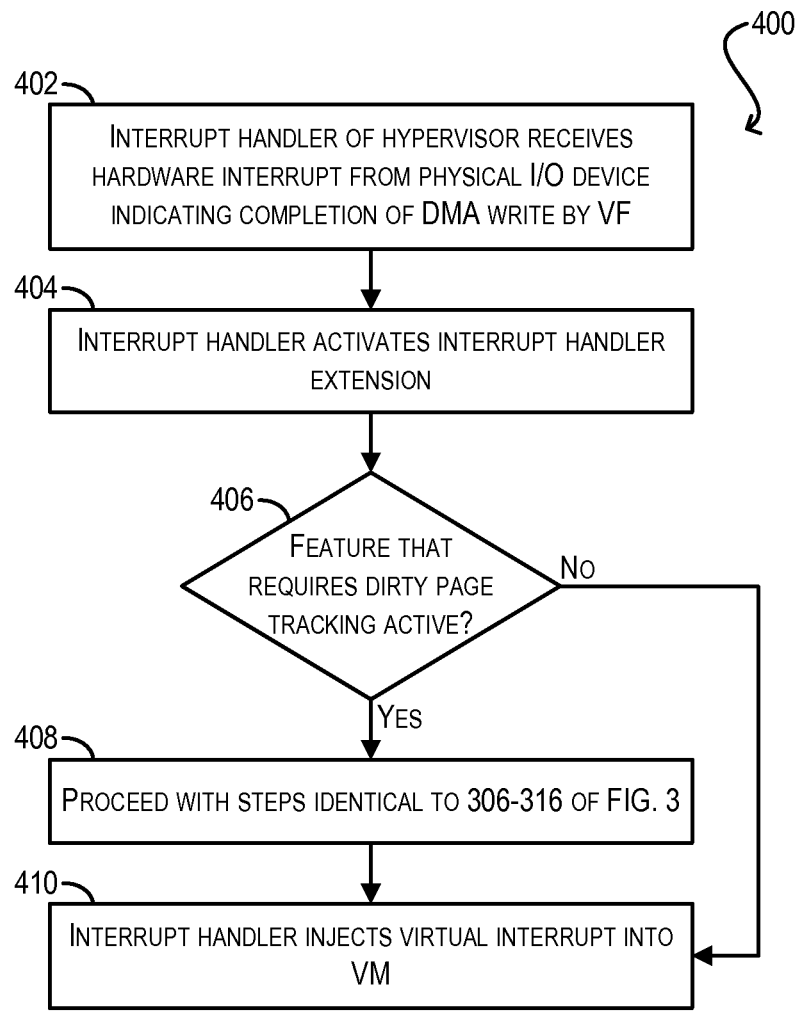
FIG. 4 depicts an alternative version of the flowchart of FIG. 3 according to an embodiment.

One potential inefficiency with flowchart 300 of FIG. 3 is that its processing introduces a certain amount of overhead in hypervisor 102 (due to, e.g., the invocation of introspection function 122), even though flowchart 300 may only be needed when virtualization features that require comprehensive dirty page tracking (e.g., live VM migration, snapshots, fault tolerance, etc.) are active. To address this, FIG. 4 depicts an alternative version 400 of flowchart 300 that may be executed by hypervisor 102 according to an embodiment.

Blocks 402 and 404 of flowchart 400 are substantially similar to blocks 302 and 304 of flowchart 300. However, at block 406, interrupt handler extension 118 performs a check to determine whether any virtualization feature that requires dirty page tracking is currently running/active. If so, flowchart 400 can perform the same steps as blocks 306-316 of flowchart 300 (block 408). However, if no such virtualization feature is currently running/active, flowchart 400 causes interrupt handler 114 to immediately inject a virtual interrupt into VM 104 (block 410), without invoking introspection function 122. In this manner, the overhead associated with executing introspection function 122 can be avoided in scenarios where its tracking capability is not needed. In other words, with the embodiment of FIG. 4, there is no performance overhead during normal VM execution, since introspection function 122 is only called when live VM migration or other such features are active.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method performed by a host system for tracking virtual machine (VM) memory modified by a physical input/output (I/O) device supporting I/O virtualization, the method comprising:
    receiving, by a hypervisor of the host system, a hardware interrupt from the physical I/O device, the hardware interrupt indicating that a virtual function (VF) of the physical I/O device has completed a direct memory access (DMA) write to a guest memory space of a VM running on the host system;
    invoking, by the hypervisor in response to the hardware interrupt, a function implemented by a physical function (PF) driver of the physical I/O device, the function being configured to inspect the VF's state in order to identify memory portions modified by the DMA write; and
    marking, by the hypervisor in a hypervisor-level page table, one or more memory pages corresponding to the identified memory portions as dirty pages.

2. The method of claim 1 wherein the receiving is performed by an interrupt handler of the hypervisor, and wherein the invoking comprises:
    activating, by the interrupt handler, an interrupt handler extension of the hypervisor; and
    invoking, by the interrupt handler extension, the function implemented by the PF driver.

3. The method of claim 1 wherein the function is a callback function that implements a standard callback interface defined by the hypervisor.

4. The method of claim 1 wherein the function inspects the VF's state by:
    accessing a receive (RX) descriptor ring associated with the VF, the RX descriptor ring including a plurality of descriptor entries, each descriptor entry including a buffer address of a memory buffer in the guest memory space of the VM;
    traversing the RX descriptor ring to identify descriptor entries corresponding to memory buffers written to as part of the DMA write; and
    returning a list of buffer addresses included in the identified descriptor entries.

5. The method of claim 4 further comprising:
    converting, by the hypervisor, the list of buffer addresses into memory page numbers for the one or more memory pages prior to performing the marking.

6. The method of claim 4 wherein the RX descriptor ring that is traversed is a shadow copy of another RX descriptor ring maintained in the guest memory space of the VM.

7. The method of claim 1 wherein the invoking and the marking are performed only if the hypervisor is concurrently carrying out a virtualization function that requires tracking of memory pages dirtied by the DMA write.

8. The method of claim 1 wherein the physical I/O device is a Single Root I/O Virtualization (SR-IOV) device.

9. A non-transitory computer readable storage medium having stored thereon program code executable by a host system, the program code embodying a method for tracking virtual machine (VM) memory modified by a physical input/output (I/O) device supporting I/O virtualization, the method comprising:

receiving, by a hypervisor of the host system, a hardware interrupt from the physical I/O device, the hardware interrupt indicating that a virtual function (VF) of the physical I/O device has completed a direct memory access (DMA) write to a guest memory space of a VM running on the host system;

invoking, by the hypervisor in response to the hardware interrupt, a function implemented by a physical function (PF) driver of the physical I/O device, the function being configured to inspect the VF's state in order to identify memory portions modified by the DMA write; and marking, by the hypervisor in a hypervisor-level page table, one or more memory pages corresponding to the identified memory portions as dirty pages.

10. The non-transitory computer readable storage medium of claim 9 wherein the receiving is performed by an interrupt handler of the hypervisor, and wherein the invoking comprises:

activating, by the interrupt handler, an interrupt handler extension of the hypervisor; and invoking, by the interrupt handler extension, the function implemented by the PF driver.

11. The non-transitory computer readable storage medium of claim 9 wherein the function is a callback function that implements a standard callback interface defined by the hypervisor.

12. The non-transitory computer readable storage medium of claim 9 wherein the function inspects the VF's state by:

accessing a receive (RX) descriptor ring associated with the VF, the RX descriptor ring including a plurality of descriptor entries, each descriptor entry including a buffer address of a memory buffer in the guest memory space of the VM;

traversing the RX descriptor ring to identify descriptor entries corresponding to memory buffers written to as part of the DMA write; and returning a list of buffer addresses included in the identified descriptor entries.

13. The non-transitory computer readable storage medium of claim 12 wherein the method further comprises:

converting, by the hypervisor, the list of buffer addresses into memory page numbers for the one or more memory pages prior to performing the marking.

14. The non-transitory computer readable storage medium of claim 12 wherein the RX descriptor ring that is traversed is a shadow copy of another RX descriptor ring maintained in the guest memory space of the VM.

15. The non-transitory computer readable storage medium of claim 9 wherein the invoking and the marking are performed only if the hypervisor is concurrently carrying out a virtualization function that requires tracking of memory pages dirtied by the DMA write.

16. The non-transitory computer readable storage medium of claim 9 wherein the physical I/O device is a Single Root I/O Virtualization (SR-IOV) device.

17. A host system comprising:
a processor;
a hardware virtualization layer running on the processor and supporting execution of a plurality of contexts;
a physical input/output (I/O) device having at least a physical function (PF) and a plurality of virtual functions (VFs) associated with the PF, wherein there is one VF assigned to each of the contexts; and
a non-transitory computer readable medium having stored thereon program code that, when executed by the processor, causes the processor to:

receive, via the hardware virtualization layer, a hardware interrupt from the physical I/O device, the hardware interrupt indicating that a first VF of the physical I/O device has completed a direct memory access (DMA) write to a guest memory space of the context corresponding to the first VF;

invoke, via the hardware virtualization layer in response to the hardware interrupt, a function implemented by a physical function (PF) driver of the physical I/O device, the function being configured to inspect the first VF's state in order to identify memory portions modified by the DMA write; and mark, via the hardware virtualization layer in a page table maintained by the hardware virtualization layer, one or more memory pages corresponding to the identified memory portions as dirty pages.

18. The host system of claim 17 wherein the hardware virtualization layer includes a hypervisor, and wherein each context in the plurality of context includes a virtual machine (VM).

19. The host system of claim 18 wherein the program code that causes the processor to invoke the function implemented by the PF driver comprises program code that causes the processor to:

activate an interrupt handler extension of the hypervisor; and invoke the function via the interrupt handler extension.

20. The host system of claim 18 wherein the function is a callback function that implements a standard callback interface defined by the hypervisor.

21. The host system of claim 18 wherein the function inspects the first VF's state by:

accessing a receive (RX) descriptor ring associated with the first VF, the RX descriptor ring including a plurality of descriptor entries, each descriptor entry including a buffer address of a memory buffer in the guest memory space of the context;

traversing the RX descriptor ring to identify descriptor entries corresponding to memory buffers written to as part of the DMA write; and returning a list of buffer addresses included in the identified descriptor entries.

22. The host system of claim 21 wherein the program code further causes the processor to:

convert, via the hypervisor, the list of buffer addresses into memory page numbers for the one or more memory pages prior to performing the marking.

23. The host system of claim 21 wherein the RX descriptor ring that is traversed is a shadow copy of another RX descriptor ring maintained in the guest memory space of the context.

24. The host system of claim 18 wherein the program code causes the processor to invoke the function and mark the one or more memory pages only if the hypervisor is concurrently carrying out a virtualization function that requires tracking of memory pages in a VM dirtied by the DMA write.

25. The host system of claim 17 wherein the physical I/O device is a Single Root I/O Virtualization (SR-IOV) device.

* * * * *